United States Patent
Burry et al.

(10) Patent No.: US 7,325,899 B2
(45) Date of Patent: Feb. 5, 2008

(54) REAL-TIME INTERLACE ADJUSTMENT BASED ON PREDICTED IMAGE QUALITY

(75) Inventors: Aaron Michael Burry, West Henrietta, NY (US); Peter Paul, Webster, NY (US)

(73) Assignee: Xerox Corporation, Stamford, CT (US)

( * ) Notice: Subject to any disclaimer, the term of this patent is extended or adjusted under 35 U.S.C. 154(b) by 279 days.

(21) Appl. No.: 10/998,673

(22) Filed: Nov. 30, 2004

(65) Prior Publication Data

US 2006/0114287 A1    Jun. 1, 2006

(51) Int. Cl.
*B41J 29/38* (2006.01)

(52) U.S. Cl. .............. 347/41; 347/19; 347/40
(58) Field of Classification Search .......... 347/40, 347/41, 19, 16, 42, 12
See application file for complete search history.

(56) References Cited

U.S. PATENT DOCUMENTS

| | | | |
|---|---|---|---|
| 6,688,726 B2 * | 2/2004 | Bauer | 347/41 |
| 6,935,715 B2 * | 8/2005 | Bates et al. | 347/16 |
| 2005/0052494 A1 * | 3/2005 | Takahashi et al. | 347/41 |

* cited by examiner

Primary Examiner—Lam Son Nguyen
(74) Attorney, Agent, or Firm—Oliff & Berridge, PLC

(57) ABSTRACT

Systems and methods of marking control achieve improved image quality in a multipass marking process by taking into account positioning errors that have already occurred in prior marking passes while building the image, and compensates for them in real-time by modifying the remaining interlace locations of the marking subsystem in order to minimize predicted image quality defect perception in the resultant image. The adjustment are preferably based on minimizing a defect perceivability metric. One such suitable metric is a frequency metric, preferably the power spectral density of the resultant image evaluated at the fundamental frequency (1/D), where D represents the spacing of marking devices, such as the spacing of print head nozzles.

20 Claims, 12 Drawing Sheets

PASS #1 – 3x6 PIXEL PATCH

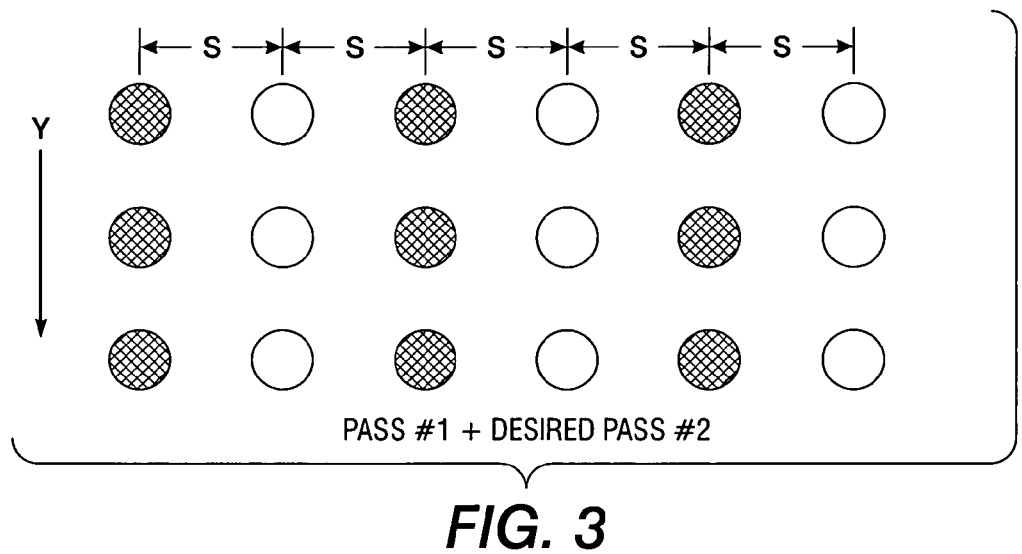
FIG. 3 — PASS #1 + DESIRED PASS #2
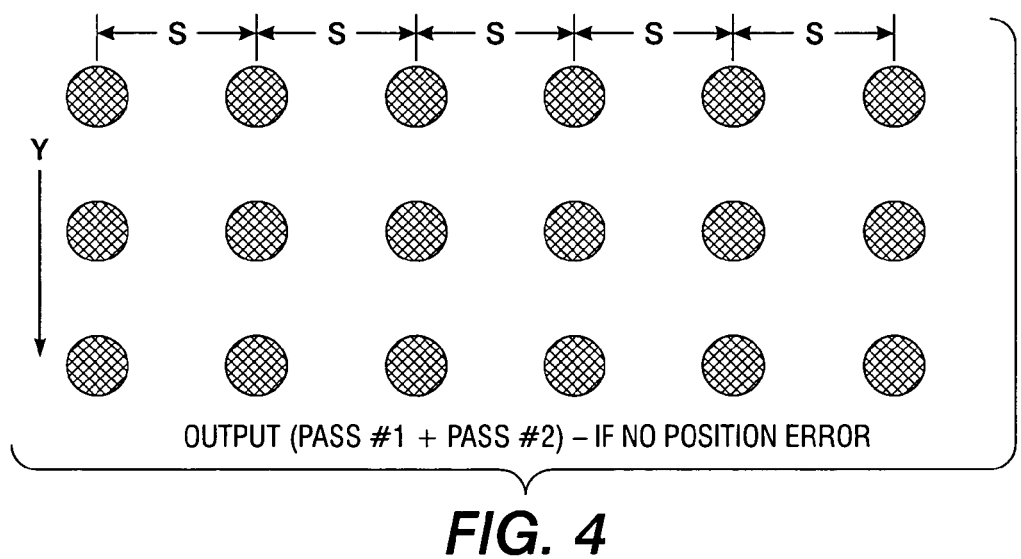
FIG. 4 — OUTPUT (PASS #1 + PASS #2) – IF NO POSITION ERROR Top patches are the reference case (assumed no error or "perfect")

Abutting of "perfect" and error patches in the print at this point - note small visible overlap Bottom patches have an induced 100 micron error in the second pass of printing

TYPICAL PRINT SAMPLE

Top patches are the reference case (assumed no error or "perfect")

Abutting of "perfect" and error patches in the print

Bottom patches have an induced 100 micron error in the second pass of printing. In this case the proposed algorithm adjusts successive locations.

ALGORITHM ON

Top patches are the reference case (assumed no error or "perfect")

Abutting of "perfect" and error patches in the print

Bottom patches have an induced 100 micron error in the second pass of printing. In this case the pre-computed locations are used.

ALGORITHM OFF

FIG. 10
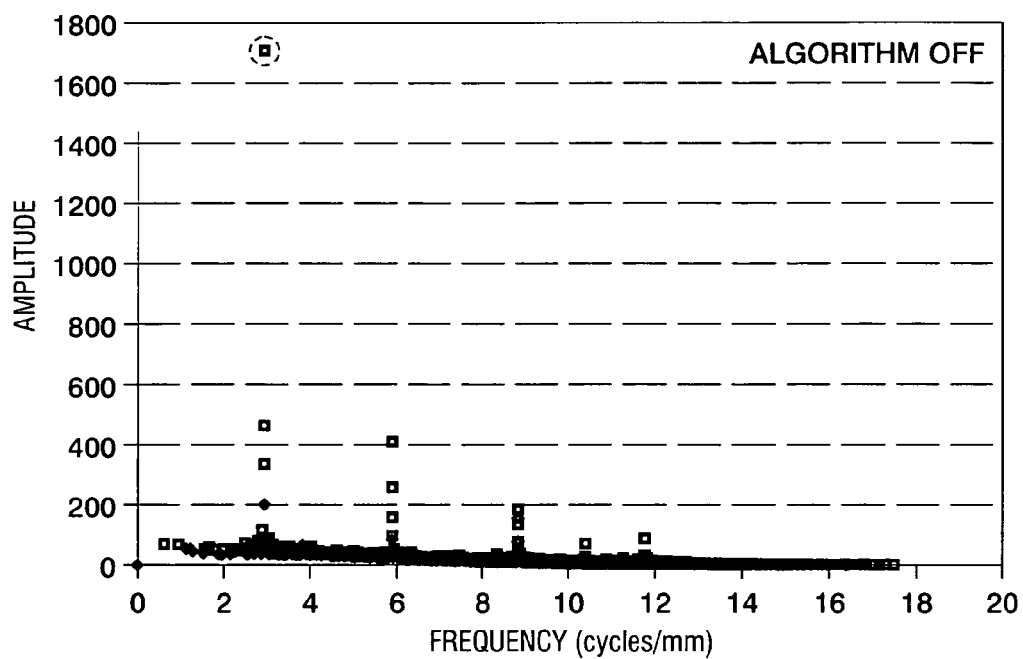
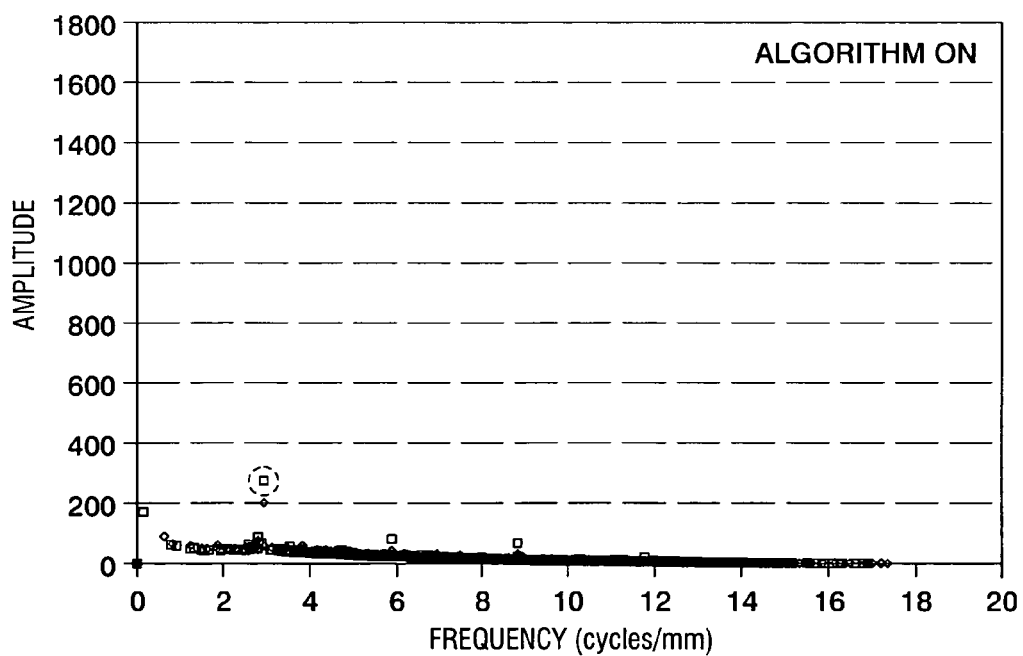
FIG. 11

FIG. 12
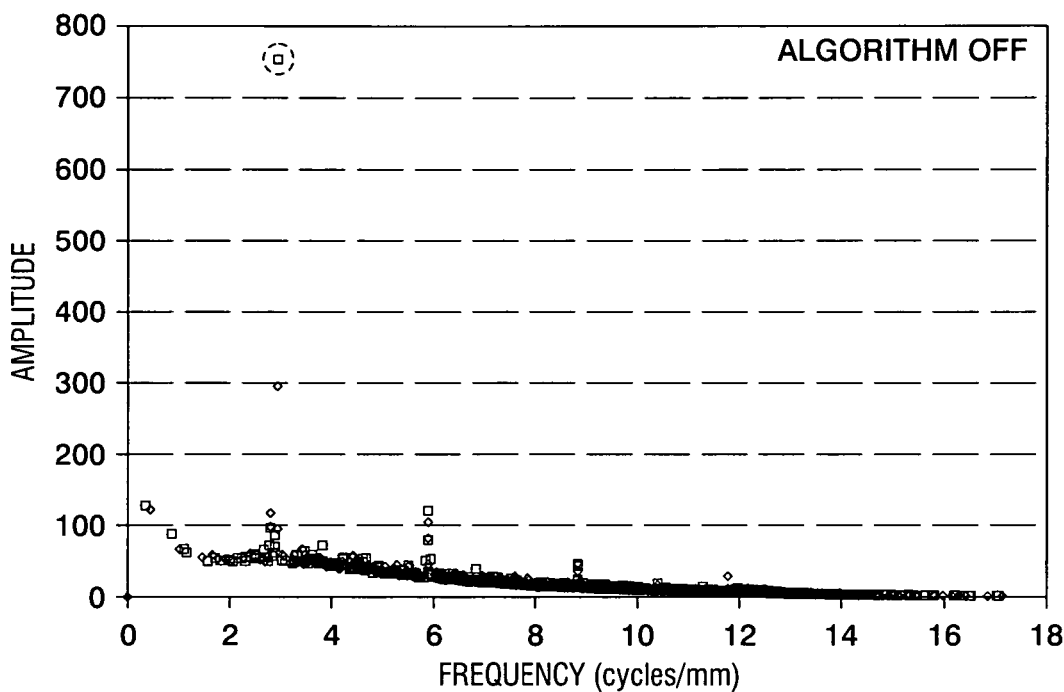
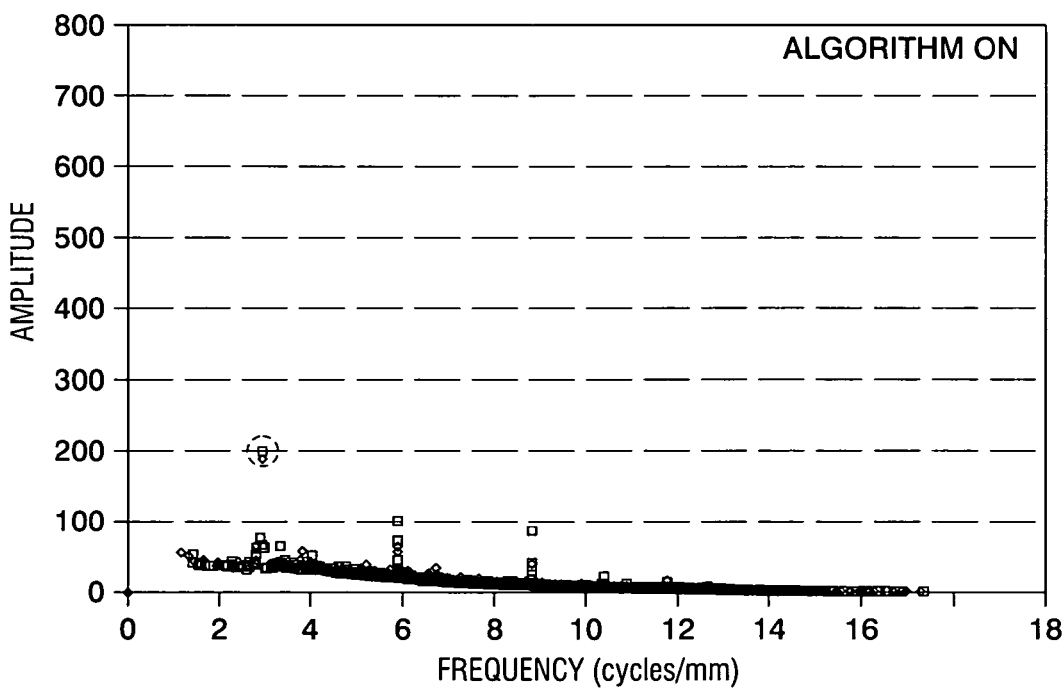
FIG. 13

REAL-TIME INTERLACE ADJUSTMENT BASED ON PREDICTED IMAGE QUALITY

BACKGROUND

A real-time interlace adjustment accounts for position errors from prior print passes to determine subsequent print pass positioning and improve output imaging.

For some inkjet printing applications, it is necessary to interlace multiple passes of the print head to achieve a higher effective printing resolution than the print head alone is capable of. For example, as shown in FIG. 1, a simple print head 100 with three exemplary nozzles 110A-C having a uniform spacing of D, can achieve an output image resolution of (1/D) if implemented in a fixed position. However, if the print head is allowed to make multiple passes in printing the output image, higher resolutions are achievable. As an example, take the case where (1/D) is equal to 150 dpi. In this example, the print head could be indexed to two print locations to achieve an output resolution of 300 dpi. In order to print a solid color patch at a print resolution of (2/D) (i.e., 300 dpi), the print head must make two passes, printing one half of the image in each pass. However, in order to achieve a uniform solid color patch at the desired output image resolution of (2/D), it is desired to place the pixels from the second pass of the print head exactly halfway between the pixels from the first pass (i.e., offset laterally from the first pass by a distance D/2).

The result of the first pass is shown in FIG. 2, with the first pass print droplets being illustrated with gray solid form. The positioning of a "desired" second pass is shown in outline form in FIG. 3 and is achieved by indexing print head 100 laterally in direction X by a distance D/2=S and advancing the print head, or the substrate, in the process direction Y. If indexed precisely, the resultant image would appear as in FIG. 4 and would have the same effect as a print generated in a single pass using a print head with twice the resolution (2/D).

However, in such a multi-pass printing scheme, there is a likely probability of introducing defects into the resultant image due to positioning errors in the motion of the print head. Specifically, assume that the printing application requires the print head to release ink at N fixed locations in the cross-process direction in order to build the final image. These desired printing locations for the system are known a priori (Xp1, Xp2, ..., XpN). Thus, one may assume that the resultant image would always appear as shown in FIG. 4. However, there is always some amount of positioning error in the motion of the print head from one print location to the next. These errors (e1, e2, ..., eN) cause the spacing between consecutive dots on the paper to become non-uniform, possibly leading to noticeable defects in the output image.

FIG. 5 shows the error differences between desired and actual positioning of the second pass printing, with the actual second pass printing also being shown in gray solid form. This results in the output image shown in FIG. 6. Note in this figure that the resultant image does not look uniform as it was intended to. In fact, some columns of pixels are spaced too closely, while others are separated too far apart. These defects appear as light and dark streaks in the output image. The fundamental spatial frequency of these defects can be inferred from the figure and is equal to the inverse of the nozzle spacing (1/D):

$$f_{error}=1/D(cycles/mm),$$

and is independent of the number of passes used. Note that harmonics of this fundamental frequency may also affect the resulting print quality.

An example of the typical light and/or dark bands in the print resulting from such positional error is shown in FIG. 7, which is reproduced using a more typical print head resolution. In FIG. 7, the top half was printed as a reference image with no positional errors, while the bottom half is shown with an induced 100 micron positional error to simulate the effect positional error has on the resultant image. Notice the strong periodic streaking effect on the lower image.

In the past, the standard approach to minimizing the effects of such positioning errors was to implement a scheme to reduce the magnitude of the positioning errors themselves. In most cases, electronic sensors and actuators were combined to implement control algorithms to improve the positioning accuracy of the mechanism that moves the print head. These types of schemes attempted to minimize the position error that was present at each of the printing locations independent of the positioning errors at prior print locations. That is, these methods calculated target positions for all print passes in advance of printing and tried to minimize the positional error by controlling the printing to occur as close as possible to the desired target position. Other systems used high quality/expensive mechanical positioning systems in an effort to improve positioning accuracy. There have also been prior systems that look at offline optimization schemes that are meant to adjust the calculation of the a priori positions before printing based on measured characteristics of the print head, for example (e.g. manufacturing defects).

However, such schemes can never provide perfect positioning of the print head. In other words, there will always become amount of residual error in the positioning of the print head at each location.

In addition, because of the human eye's ability to perceive the spatial frequency content of an image, these types of correction schemes do not necessarily optimize the overall perceived output image quality. In fact, it is not only the raw magnitude of the position errors themselves that determines the level of defect in the image, but also the resultant frequency content. Thus, smaller positioning errors (relative to the a priori desired print locations) on subsequent moves (given that there are errors in prior moves) do not always correspond to less noticeable defects in the output image.

SUMMARY

Exemplary methods and systems of interlace adjustment provide interlace marking having improved image quality.

Exemplary methods and systems separately provide control of a marking system that modifies future marking passes in a multi-pass marking process based on detected errors in prior marking passes and the predicted image quality attributes of the resultant image.

In exemplary embodiments, the methodology preferably uses a frequency based metric and the detected positional errors to compute and adjust target print locations for subsequent passes.

In exemplary embodiments, the methodology is derived from the power spectral density of the resultant image evaluated at the fundamental frequency of the marking system. Harmonics can also be important, but they are modulated by the human visual transfer function. In exemplary implementations, only the fundamental frequency is used because the higher order harmonics were believed to be sufficiently attenuated by human visual perception (as defined by human visual transfer functions defined in the literature).

In exemplary embodiments, the fundamental frequency is the inverse of the nozzle spacing of the print head.

In exemplary embodiments, the system alters the subsequent pass print locations to minimize the frequency metric.

In exemplary embodiments, the interlace adjustment takes place "on the fly" in real-time between print passes.

In various exemplary embodiments, the systems and methods can achieve improved image quality in a multi-pass marking application by modifying the desired interlace pattern based on the actual locations of the marking subsystem when marking previous passes of the current image. In this way, the methodology takes into account the positioning errors that have already occurred in prior marking passes while building the image, and compensates for them by modifying the remaining interlace locations of the marking subsystem in order to minimize the defects in the resultant image. The adjustments to the desired marking locations are based on a defect perceivability metric, preferably a minimization of a frequency based metric. This metric is derived from the frequency content of the resultant image and may be the power spectral density of the resultant image evaluated at the fundamental frequency (1/D), where D represents the marking subsystem spacing. This is contrary to most other algorithms which usually focus solely on positioning the print head very accurately at each of the predetermined print locations—thereby not accounting for any of the errors that have already occurred while building the image nor for the resultant perceived image quality in the output image.

BRIEF DESCRIPTION OF THE DRAWINGS

Various exemplary embodiments will be described in detail, with reference to the following figures, wherein:

FIG. 3 illustrates a desired location for second pass pixels so as to provide an interlaced output having twice the effective density of the print head of FIG. 1;

FIG. 4 illustrates a desired theoretical image output after two-pass printing assuming no error in print position occurs;

FIG. 10-11 illustrate experimental structured noise spectrum results without interlace adjustment and with exemplary interlace adjustment according to an exemplary embodiment of the invention when a 100 micron positioning error occurs in prior print passes;

FIGS. 12-13 illustrate experimental structured noise spectrum results without interlace adjustment and with exemplary interlace adjustment according to an exemplary embodiment of the invention when a 50 micron positioning error occurs in prior print passes;

DETAILED DESCRIPTION OF PREFERRED EMBODIMENTS

Figure 1:
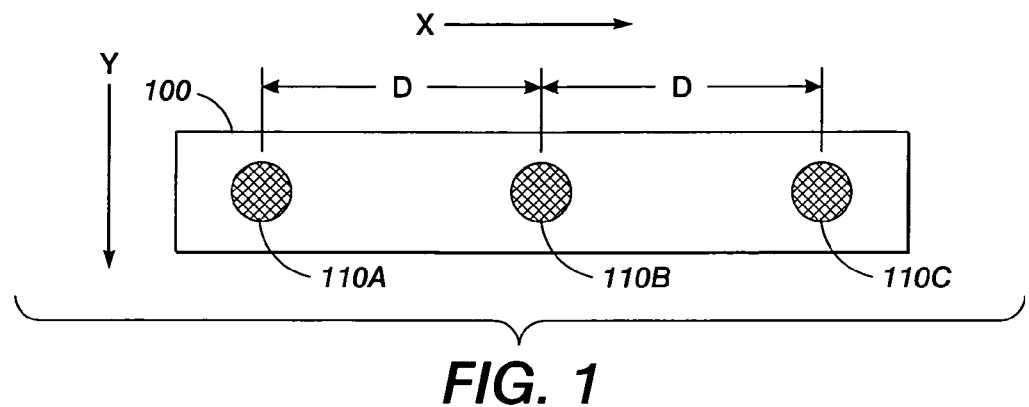
FIG. 1 illustrates an exemplary model of a print head having a fixed spacing of print head nozzles.
Figure 2:
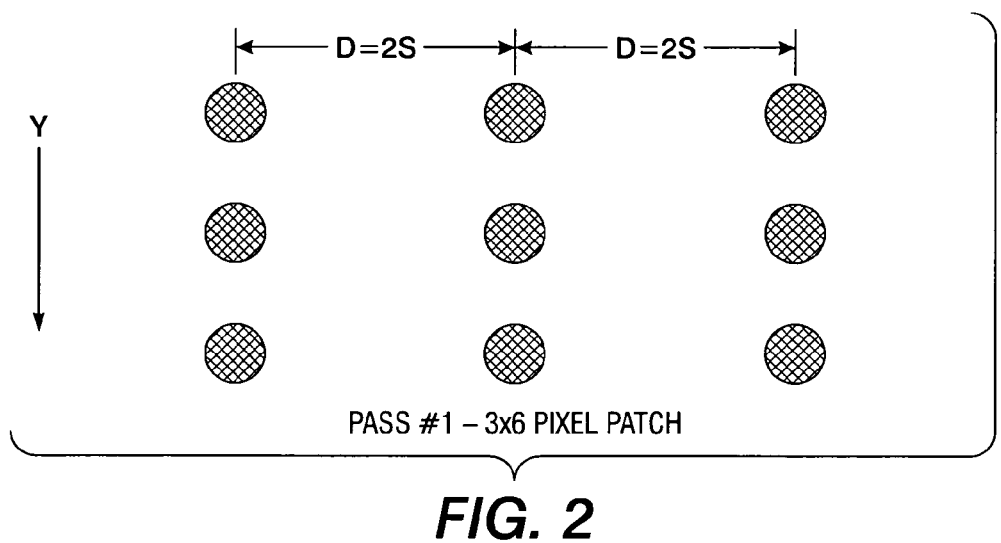
FIG. 2 illustrates a first pass printing of a 3×6 pixel square in a process direction.
Figure 5:
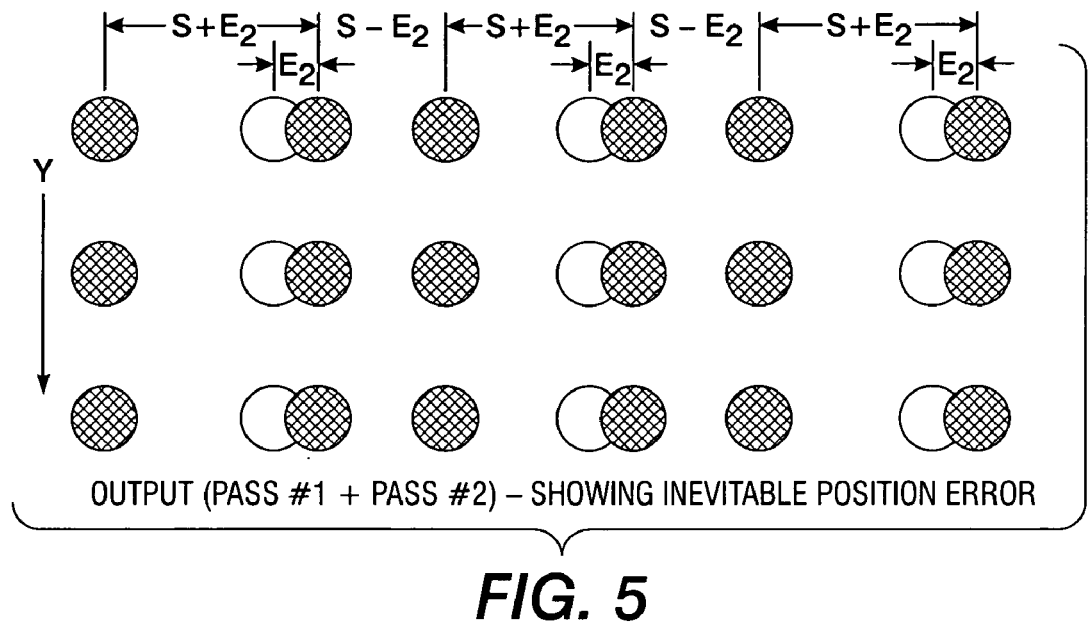
FIG. 5 illustrates positional errors $e_1$-$e_2$ generated during actual printing by the print head.
Figure 6:
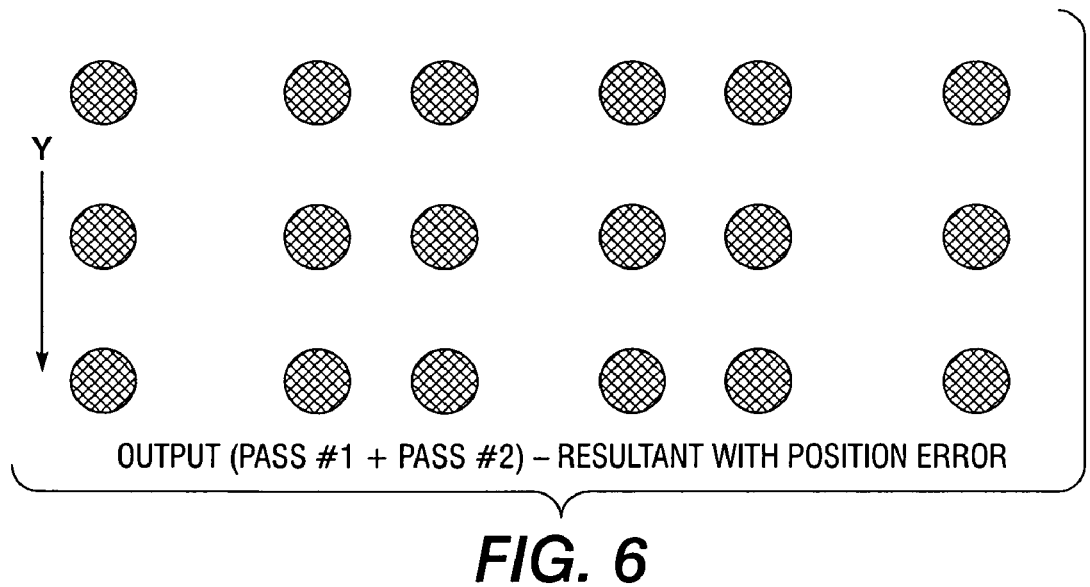
FIG. 6 illustrates a resultant image output after two-pass printing in which positional errors have occurred in the second print pass.
Figure 7:
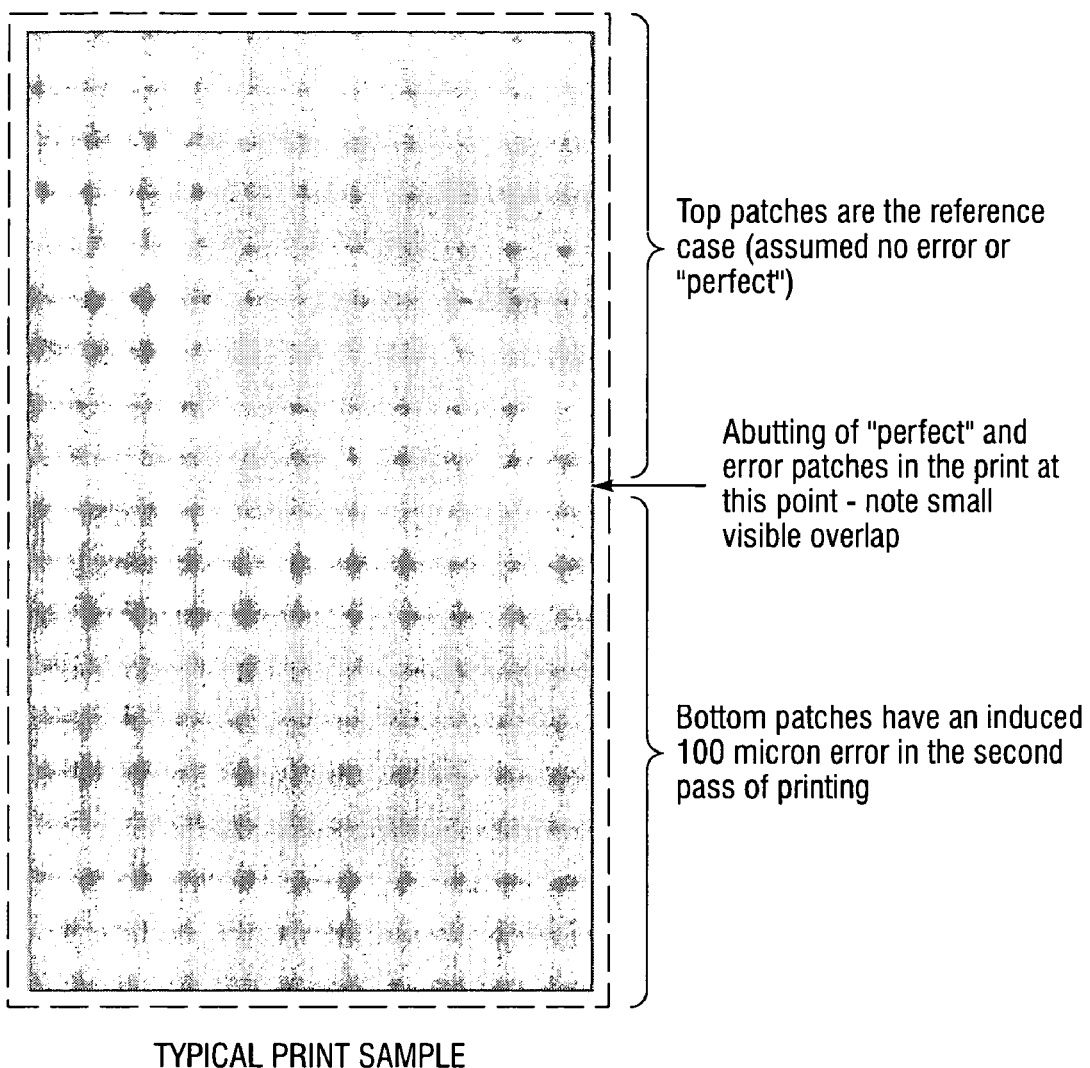
FIG. 7 illustrates a high resolution, two-part image in which a top part has no positional errors and the lower part has a positional error in the second pass.

Systems and methods of marking control achieve improved image quality in a multi-pass marking application, such as in a multipass ink jet printer, by modifying the desired interlace pattern based on the actual locations of the marking engine output (e.g., ink jet print head) when printing previous passes of the current image. In this way, the methodology takes into account the positioning errors that have already occurred in prior marking passes while building the image, and compensates for them by modifying the remaining interlace locations of the marking subsystem in order to minimize the defects in the resultant image. The adjustments to the desired marking locations are preferably based on minimizing a defect perceivability metric. The frequency content of the fundamental is an example of this. This metric is derived from the frequency content of the resultant image and is preferably the power spectral density of the resultant image evaluated at the fundamental frequency (1/D), where D represents the marking subsystem spacing, such as the nozzle spacing of print head 100. This is contrary to most other algorithms which usually focus solely on positioning the print head very accurately at each of the predetermined print locations—thereby not accounting for any of the errors that have already occurred while building the image nor for the resultant frequency content in the output image.

The approach being presented is intended to improve the resultant image quality in the face of position errors in the print head locations. In order to do so, a metric is defined that is based on the spatial frequency content of the output image in the cross-process direction. An exemplary metric is the power spectral density (PSD) of the output image evaluated at the fundamental error frequency (1/D). Assuming a six-pass printing scheme, the analytic expression of the power-spectral density of the output image in the cross-process direction is given below:

$$S(\overline{X}_a, w) = |[e^{-jwX_{a1}} + e^{-jwX_{a2}} + e^{-jwX_{a3}} + e^{-jwX_{a4}} + e^{-jwX_{a5}} + e^{-jwX_{a6}}]P_1(W)|^2 \quad (1)$$

where the locations, $$\overline{X}_a = [X_{a1}, X_{a2}, X_{a3}, X_{a4}, X_{a5}, X_{a6}]$$

are the actual print locations (including any positioning errors that have occurred).

The expression for $P_1(w)$ is as follows:

$$P_1(w) = \frac{4\pi}{D} \sum_{k=-\infty}^{\infty} G\left(\frac{2\pi k}{D}\right) \mathrm{sinc}\left[\frac{wL}{\pi} - \frac{2kL}{D}\right] \quad (2)$$

In this expression, w is the frequency variable (omega), G(w) represents the Fourier transform of the Gaussian distribution which is a function of the frequency variable w, and L is the width of the patch being printed. The frequency of interest in the evaluation of the PSD metric is the fundamental frequency of the defect that occurs in the output prints (light and dark periodic streaks) as a result of positioning errors. This frequency is equal to the inverse of the nozzle spacing (1/D).

Using equation (1) for the PSD, it is possible to analytically determine the degree of perceptibility of positioning errors in the output image while the image is being printed. This information can then be used to adjust the remaining print locations such that the overall perceptibility of defects in the output image is minimized.

Assume a six-pass printing application with the set of predetermined desired locations for the print head:

$$\overline{X}_p = [X_{p1}, X_{p2}, \ldots X_{p6}]^T$$

and the desired spacing between consecutive print locations defined as:

$$\overline{X}_\Delta = [X_{\Delta 1}, X_{\Delta 2}, \ldots, X_{\Delta 5}]^T$$

where,
$X_{\Delta 1} = X_{p2} - X_{p1}$,
$X_{\Delta 2} = X_{p3} - X_{p2}$,
etc.

Label the actual positions of the print head at each of the six passes during printing as:

$$\overline{X}_a = [X_{a1}, X_{a2}, \ldots, X_{a6}]^T$$

Now assume that the first four print locations are perfect (occur exactly at the predetermined desired print locations), but that there is an error of known magnitude in the fifth printing location. Thus, $$\overline{e} = \begin{bmatrix} e_1 \\ e_2 \\ e_3 \\ e_4 \\ e_5 \\ e_6 \end{bmatrix} = \begin{bmatrix} 0 \\ 0 \\ 0 \\ 0 \\ K \\ e6 \end{bmatrix}$$

where K is a known value. The inventive algorithm finds an optimal position for the sixth print location that will minimize the resultant error in the output image.

Mathematically, the problem can be posed as follows:

Given: $\overline{e} = [0\ 0\ 0\ 0\ K e_6]^T$, where K is a known constant and $e_6$ is a variable.
Find: $e_6$ such that $$f\left(\overline{X}_p + \overline{e}, \frac{1}{D}\right)$$

is minimized, where $f(\overline{X}, \omega)$ is the power spectral density metric defined in equation (1) and Xp is as defined above.

Figure 17:
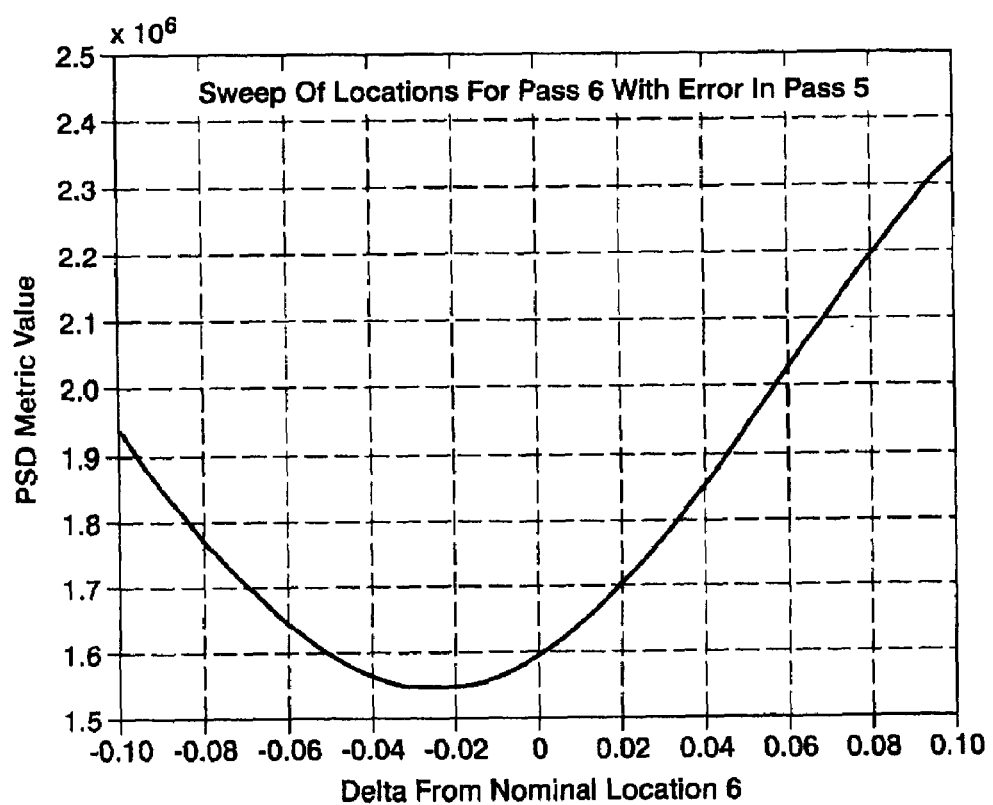
FIG. 17 illustrates a graph of PSD metric valves.

The solution to this problem is then the optimal position for this final print location (X6) based on the defined metric. As an example, take K=−50 microns (50 microns short of the desired location). FIG. 17 illustrates the value of the PSD metric as the location X6 is varied relative to the a priori desired location (Xp6) for this case.

From this Table, it is easily seen that the minimum of the PSD metric ("the location of the minimum perceived defect") does not occur at the a priori selected position Xp6 (i.e., the nominal location corresponding to an error of 0.00 in the graph above). In fact, for this example case, the position of the print head for the final pass of the image should be adjusted to be 25 microns less than Xp6 (the a priori goal location for pass number six). This effectively equates to introducing a known shift in the last print position in order to compensate for an error in the position of a prior print pass and to thereby achieve an improvement in the perceived image quality in the output.

The intent of this example demonstrates that, once an error has occurred in one of the interlaced print head positions, the remaining a priori determined print locations are not necessarily those that will achieve the minimal amount of defects in the output image. Thus, prior methods that predict in advance print positions, and thereby do not take into effect the errors generated during prior print passes, may be able to closely control subsequent passes to a target location; however such target locations are likely to be sub-optimal locations for the print pass from an output print quality point of view since they do not account for errors that have already occurred in prior print passes.

The results of the previous example can be extended to errors that occur at any of the locations or passes during the building of an image. Another example is given to illustrate this point. Assume the same six-pass printing process as before. In this example, the first pass of the print is positioned perfectly, but there is an error of K microns in the position of the print head for the second print pass. The objective now is to determine what the remaining print locations should be to achieve optimal print quality. This effectively means, Given: [e1 e2]=[0 K], where K is a known constant value.

Find: [e3 e4 e5 e6] such that $$f\left(\overline{X} + \overline{e}, \frac{1}{D}\right)$$

is minimized.

For illustration purposes, rather than tackling this multi-dimensional optimization problem directly, the problem is simplified slightly by assuming that the remaining print positions (positions X4 through X6) will be located such that the deltas between them are exactly the same as those between the a priori print positions—in other words the values for [$X_{\Delta 3}\ X_{\Delta 4}\ X_{\Delta 5}$] are maintained. The reasoning for this simplification is based on the desire to have uniformly spaced pixels in the output image. Using this constraint, the problem turns into a single dimension optimization that is relatively easy to implement. So, the optimal location of X3 is chosen that will lead to the minimum value of the PSD metric in equation (1). Once the location X3 is selected and the print head is moved, there is presumably another error introduced into the print—that from the position error in placing the print head at the desired location X3. So, the optimization process is repeated to find the best location for X4. This process is continued until all six passes of the image have been printed. That is, after the fourth pass, the values for the fifth pass are computed, and then after completion of the fifth pass, values for the sixth pass are computed. With this methodology, each subsequent pass takes into account the known errors generated in prior passes to adjust "on the fly" the current or subsequent pass target locations to optimize the output image quality.

This methodology is obviously adaptable to any multiple pass marking or printing system in which two or more passes are taken. Thus, it can be easily extended to an interlaced printing scheme with N passes, where N is at least 2. This more general case is summarized as follows:

Prior to Print Job:
  Given:
  Desired Print Head Positions for N Passes: $\overline{X}_p = [X_{p1}, X_{p2}, \ldots, X_{pN}]$
  For the general case of the print head being located at the ith print location Xa(i) (where i is allowed to vary from 2 ... N):

As the Print is Made:
  Given:
  The present and prior actual print locations for the building of the current image: $[X_{a1}, X_{a2}, \ldots, X_{ai}]$
  Find:
  The next desired location Xd(i+1). This is achieved by first finding the minimum value of the metric for the given situation and the known constraints according to:

$$\text{Min} PSD = \min_{e_{(i+1)}} f\left(\overline{g}, \frac{1}{D}\right) \quad (3)$$

where f(.) is the PSD metric defined previously and the vector g is defined as follows:

$$\overline{g} = [X_{a1} \ldots X_{ai}(X_{P(i+1)} + e_{(i+1)})(X_{P(i+2)}e_{(i+1)}) \ldots (X_{pN\ i+e(i+1)})] \quad (4)$$

The value of e(i+1) obtained from equation (3) is then used to determine the value of Xd(i+1) as follows:

$$X_{d(i+1)} = X_{p(i+1)} + e_{(i+1)} \quad (5)$$

The value determined in equation (5) is only the desired location of the ith print position. In moving from location Xa(i) to Xa(i+1), there will presumably be another position error introduced. Thus, the optimization algorithm should be run at this location as well. This process should be repeated until the print head has moved through all of its required print locations and the resulting output image is achieved.

In order to obtain verification of the validity of this methodology, experiments were run using Xerox Phaser 850 printers.

Figure 8:
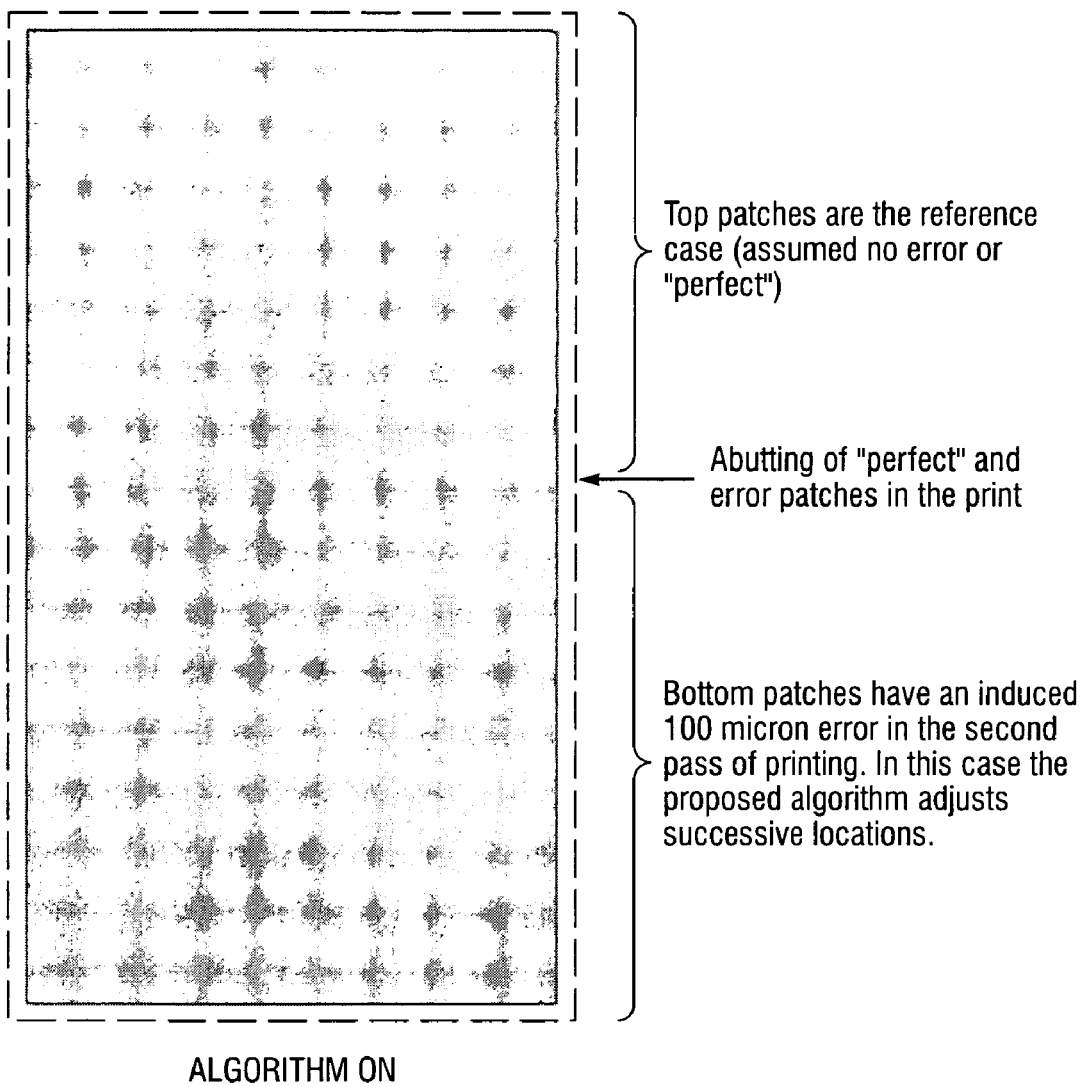
FIG. 8 illustrates a test image in which an exemplary print control methodology according to the invention is performed that provides real-time adjustment of successive print passes that takes into account positional errors in prior passes.
Figure 9:
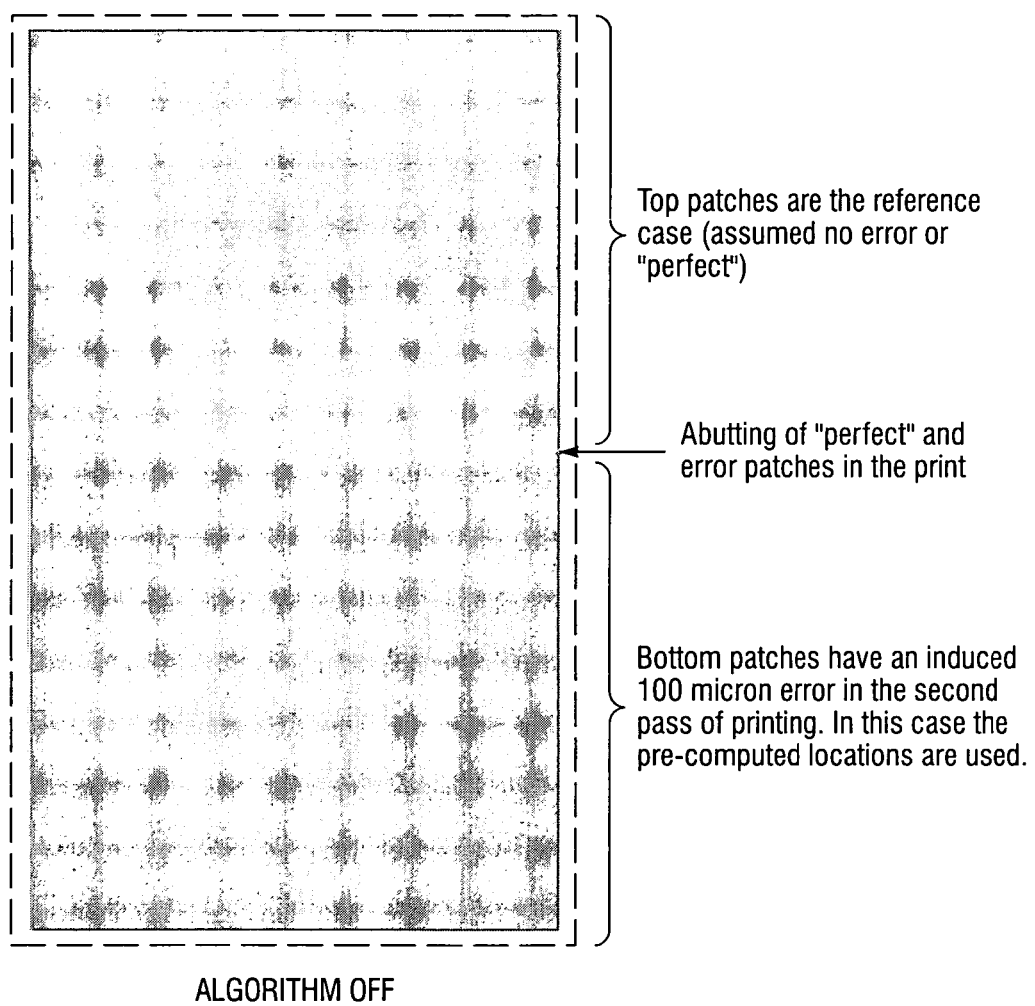
FIG. 9 illustrates a test image in which the print control methodology according to the invention is not performed and the resultant image includes banding and other defects as a result of positional errors.

In the experiments, two vertically adjacent solid patches were printed in each color. The upper patch was printed using the ideal print locations. The lower patch was then printed with a known positioning error introduced into the location of the print head during pass 2 of the imaging sequence. FIG. 8 shows the resultant output image after correction using the methods of the invention. FIG. 9 shows the resultant output image without correction. The adjacent patches in the resultant images provided a mechanism for visually comparing the images for the ideal and positioning error cases. Note the periodic defect due to the positioning error in the lower patch of FIG. 9.

The results of the experiment showed significant visual degradation for larger error magnitudes in the lower patch of FIG. 9 that do not include real-time interlace adjustment between print passes. In the second half of the experiment, the same errors were again induced in the positions of pass number two of the lower patch. However, this time an exemplary real-time print location optimization methodology according to the invention was used to adjust the print locations for passes 3-6. The results of an image quality analysis of the experimental are shown below. Two different sets of error magnitudes were used in the testing. Results for both the "method on" and "method off" cases are summarized below. The results for both the ideal patch ("NoDisplacement" in the tables) and the patch with position errors ("WithDisplacement" in the tables) are presented below in Tables 1-2.

TABLE 1

Results Summary, 50 micron Error In Pass 2

| | | NoDisplacement | | | WithDisplacement | | |
|---|---|---|---|---|---|---|---|
| | | VisualScreen | VisualNoise | AveGraininess | VisualScreen | VisualNoise | AveGraininess |
| Alg Off | cyan | 1.81 | 6.28 | 8.22 | 2.86 | 5.80 | 12.09 |
| | magenta | 0.56 | 1.56 | 2.85 | 1.46 | 1.52 | 5.30 |
| | yellow | 0.23 | 0.75 | 1.19 | 0.24 | 0.64 | 1.24 |
| | black | 0.69 | 3.47 | 3.96 | 1.03 | 3.28 | 4.58 |
| Alg On | cyan | 1.06 | 5.08 | 6.95 | 1.72 | 5.11 | 8.10 |
| | magenta | 0.50 | 1.34 | 2.60 | 0.52 | 1.58 | 3.17 |
| | yellow | 0.60 | 0.70 | 0.97 | 0.16 | 0.53 | 0.91 |
| | black | 0.39 | 2.50 | 3.05 | 0.45 | 2.44 | 3.03 |

TABLE 2

Results Summary, 100 micron Error In Pass 2

| | | NoDisplacement | | | WithDisplacement | | |
|---|---|---|---|---|---|---|---|
| | | VisualScreen | VisualNoise | AveGraininess | VisualScreen | VisualNoise | AveGraininess |
| Alg Off | cyan | 1.72 | 5.37 | 8.15 | 7.12 | 6.25 | 20.66 |
| | magenta | 0.58 | 1.23 | 2.84 | 3.58 | 1.85 | 11.49 |
| | yellow | 0.27 | 0.48 | 0.84 | 0.37 | 0.54 | 1.73 |
| | black | 0.47 | 2.52 | 3.04 | 1.92 | 3.25 | 6.22 |

TABLE 2-continued

Results Summary, 100 micron Error In Pass 2

|  |  | NoDisplacement | | | WithDisplacement | | |
|---|---|---|---|---|---|---|---|
|  |  | VisualScreen | VisualNoise | AveGraininess | VisualScreen | VisualNoise | AveGraininess |
| Alg On | cyan | 1.40 | 5.51 | 7.85 | 2.09 | 6.30 | 9.27 |
|  | magenta | 0.56 | 1.25 | 2.58 | 0.70 | 1.70 | 3.55 |
|  | yellow | 0.15 | 0.52 | 0.88 | 0.17 | 0.57 | 1.08 |
|  | black | 0.63 | 3.08 | 3.40 | 0.77 | 2.69 | 3.24 |

For each of the metrics in the tables above (Visual Screen, Visual Noise, Average Graininess), a smaller number indicates better image quality. The results summarized above show a measurable improvement in the measured print quality attributes in the output image when the proposed algorithm is used to determine the optimal positions for passes 3-6 of the image as compared to the "algorithm off" case.

Additional results are illustrated in FIGS. 10-13. FIG. 10 shows the noise spectrum for the black image in the Table 1 results without interlace correction. FIG. 11 shows the noise spectrum for the black image in the Table 2 results after interlace correction of subsequent passes. FIG. 12 shows the noise spectrum for the black image in the Table 2 3 results without interlace correction. FIG. 13 shows the noise spectrum for the black image in the Table 2 results after interlace correction of subsequent passes. The arrows point to the largest error component. As readily seen from these results, the structured noise component deviation is dramatically reduced after the algorithm is performed. This is also evidenced from the Table results, which show that even with errors in previous passes, the corrected version (shown in the lower right corner of Tables 1-2) more closely resembles the intended image (shown in the upper left corner of Tables 1-2).

Figure 14:
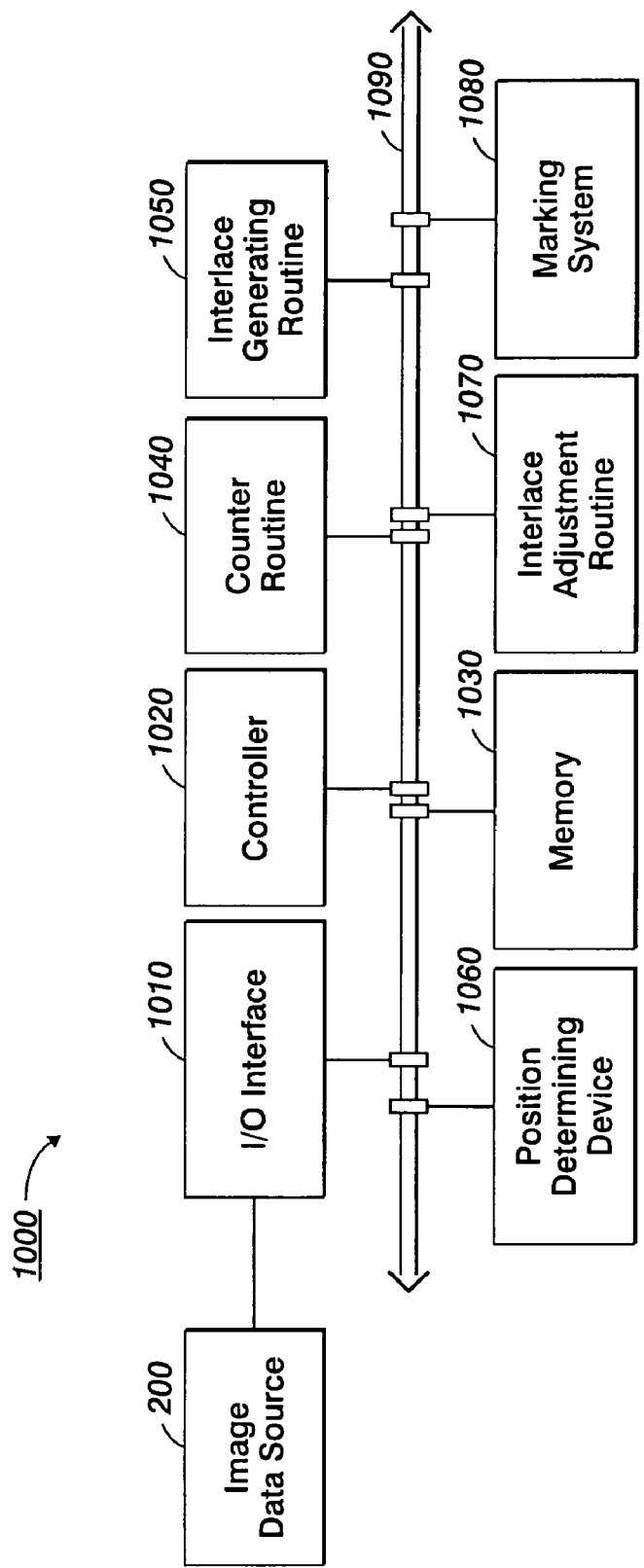
FIG. 14 illustrates a block diagram of one exemplary embodiment of a marking system according to the invention.

FIG. 14 illustrates a block diagram of one exemplary embodiment of a marking system 1000 according to the invention. The marking system in an exemplary embodiment is an ink jet printer. However, the invention is not limited to this and can include other printing and marking systems that apply a marking or print material to a surface in multiple passes. The marking system 1000 includes an input/output interface 1010, a controller 1020, a memory 1030, an interlace routine 1040, a counter routine 1050, a position determining device 1060, an interlace adjustment routine 1070, a marking subsystem 1080, and a data or control bus 1490. The I/O interface 1010 can be any known or subsequently developed interface useable to input image or other marking data into the marking system 1000 from an input image or data source 200. The input data transferred through I/O interface 1010 is stored in memory 1030 under the control of controller 1020.

The interlace routine 1040 is a conventional or subsequently developed routine that takes the image data from source 200 and converts it to print data for each of several passes, such as a two pass or six pass printing system. Based on the generated print data, which contains marking system commands to control ejection of ink or other marking media from the marking subsystem 1080, ink or other marking media from marking subsystem 1080 is deposited in accordance with the print data in an interlaced fashion.

Position determining device 1060 is a conventional or subsequently developed device that senses, detects, calculates or otherwise determines the actual location of ink or marking media from the marking subsystem during a preceding print pass. For example, it may include an encoder system, such as a linear or rotary encoder, provided to detect or control the position of print head 100 as it traverses in the X direction as known in the art. Alternatively, or in combination therewith, it may include sensors that detect actual ink droplet location as known in the art, for example using optical sensing devices.

Information from position determining device 1060 is communicated through I/O interface 1010 to memory 1030 for use by interlace adjustment routine 1070. Counter routine 1040 keeps track of a current pass number N in an N-pass printing or marking process.

Based on the detected position of preceding print passes, interlace adjustment routine 1070 determines an adjustment of print position values determined by interlace routine 1040 for at least one subsequent pass that takes into account positional errors in at least one prior pass so that the desired position for the next pass can be modified to compensate for such prior positional errors and minimize the defects in the resultant image.

Figure 15:
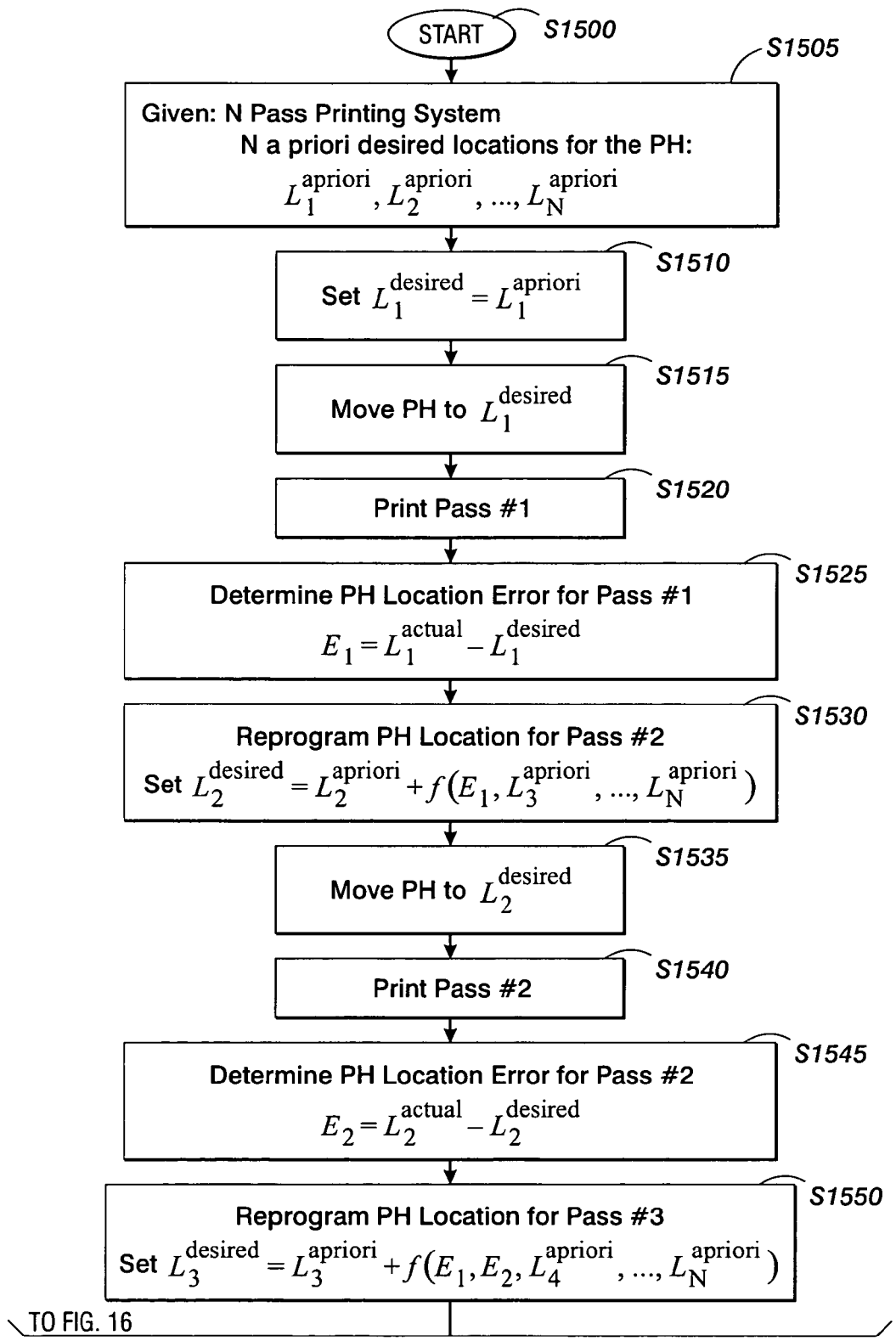
FIG. 15 illustrates an exemplary method for interlace adjustment according to an exemplary embodiment.
Figure 16:
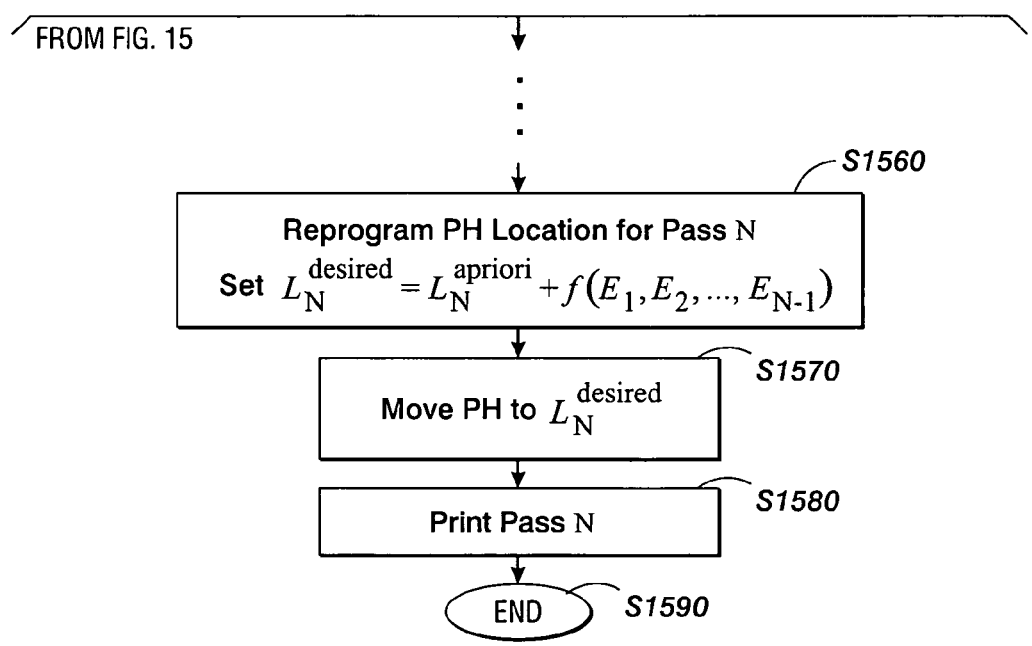

FIGS. 15-16 illustrate an exemplary method of multi-pass interlace printing in which print passes 2-N are adjusted to reflect detected positioning of prior passes to improve image quality. In this way, the methodology takes into account the positioning errors that have already occurred in prior print passes while building the image, and compensates for them by modifying the remaining desired interlace locations of the print head in order to minimize the defects in the resultant image. The adjustments to the desired print locations are preferably based on optimizing the predicted output image quality, for example, by using a frequency or other defect perceivability metric that compensates for prior errors by inducing a shift (if necessary) in subsequent passes to reduce the visual perception of the prior errors in the resultant image. This exemplary frequency metric is derived from the frequency content of the resultant image and is preferably the power spectral density of the resultant image evaluated at the fundamental frequency (1/D), where D represents the nozzle spacing of the print head.

The method starts at step S1500 and proceeds to step S1505, where in an N pass printing system, such as marking system 1000, N a priori desired locations for the print head 100 are determined by interlace routine 1040. From step S1505, the process proceeds to step S1510 where $L_1^{desired}$ is set to $L_1^{apriori}$. From step S1510, the process proceeds to step S1515 where print head 100 is moved to $L_1^{desired}$, and the first print pass is performed at step S1520 using marking subsystem 1080.

At a time between the start of the first print pass and the beginning of the second print pass, the process proceeds to step S1525 where actual positions of the resultant first pass are determined by position determining device 1060 and used by interlace adjustment routine 1070 to determine positioning error $E_1$ for the first pass. From step S1525, flow advances to step S1530 where the interlace adjustment routine 1070 reevaluates desired print locations for the second pass based on the determined error $E_1$ as well as predicted subsequent pass locations to set an adjusted print head position $L_2^{desired}$ for the second pass that is based on a metric that will improve predicted image quality.

After step S1530, the process advances to step S1535 where print head 100 is moved to $L_2^{desired}$, after which the second pass is printed at step S1540. At a time between the start of the second print pass and the beginning of the third print pass, the process proceeds to step S1545 where actual positions of the resultant second pass are similarly determined by position determining device 1060 and used by interlace adjustment routine 1070 to determine positioning error $E_2$ for the second pass. From step S1545, flow advances to step S1550 where the interlace adjustment routine 1070 reevaluates desired print locations for the third pass based on the determined error $E_2$ as well as predicted subsequent pass locations to set an adjusted print head position $L_3^{desired}$ for the third pass that is based on a metric that will improve predicted image quality.

This process of printing a pass, determining actual print locations, and modifying subsequent desired print pass locations is repeated for all N passes, until the last print pass N is completed. Flow then advances from step S1580 to step S1590 where the process stops.

While this invention has been described in conjunction with the exemplary embodiments outlined above, various alternatives, modifications, variations, and/or improvements, whether known or that are, or may be, presently unforeseen, may become apparent. For example, although exemplary embodiments are directed to an ink jet printer, the methodology can be applied to other printing, copying or marking systems that apply a liquid, solid, or dry component particles onto a substrate in a multipass procedure. Moreover, the invention is not limited to monochrome printing in an interlaced fashion, but can be extended to color marking in which the same or different colors are applied in subsequent passes and similarly adjusted based on the actual positioning of prior passes. Such interlace techniques may be used to effectively extend the resolution of the marking system or may be used to apply sequential passes in a checkerboard or other interlace pattern at a same or lower resolution as the marking system. Such interlace techniques thus do not have to print at a higher resolution (dpi) than the marking system. Additionally, the methodology can be applied to other marking systems, such as laser marking systems and engraving systems that use a multipass procedure to form a desired image on an object or substrate.

In inkjet applications, the proposed technique is equally applicable regardless of the fixed drop size, as well as for systems that can print multiple drop sizes. The proposed technique is also applicable where the substrate moves rather than the print head or print mechanism. The technique may also be used in a multi-beam ROS application, however, the interlace is in the process direction rather than the cross-process direction. The technique may also be used in any device that makes use of parallel, interlaced rasters, where the interlaces happen sequentially in time. This can be achieved by repositioning later rasters based on information about the acutal positions of previous rasters. Examples of suitable devices include a computer monitor or high definition TV.

Additionally, the adjustment of apriori positions can be made by several techniques, including calculation of absolute positions, deltas between consecutive print locations, "barber poling" (with jumps), etc. Any of these adjustments offer an improvement by allowing for online optimization of the "moves" based on information about previous print locations, as well as some prediction of output image quality based on some perceivability metric.

Accordingly, the exemplary embodiments as set forth above are intended to be illustrative, not limiting. Various changes may be made without departing from the spirit and scope of the invention. Therefore, the claimed systems and methods are intended to embrace all known, or later-developed, alternatives, modifications, variations, and/or improvements.

What is claimed is:

1. A method for marking in an interlaced, multipass marking system, comprising:
   determining a priori marking locations for a marking subsystem based on input data;
   moving the marking subsystem to the first a priori location;
   marking a first pass using the marking subsystem;
   determining marking subsystem location error for the first pass;
   adjusting the marking location for at least one subsequent pass based on the determined error for the first pass and a defect perceivability metric that is predictive of output marking quality and substantially minimizes a viewer's perception of the defect;
   moving the marking subsystem to the adjusted marking location for the subsequent pass; and
   marking the subsequent pass.

2. The method for marking according to claim 1, wherein the metric includes a frequency metric.

3. The method for marking according to claim 2, wherein the frequency metric includes the power spectral density of the input data evaluated at a fundamental frequency (1/D) of the marking subsystem, where D is the spacing between marking devices of the marking subsystem.

4. The method for marking according to claim 3, wherein the marking location for the at least one subsequent pass corresponds to the minimum value of the power spectral density metric.

5. The method for marking according to claim 3, wherein the power spectral density is $$S(\overline{X}_a, w) = |[e^{-jwX_{a1}} + e^{-jwX_{a2}} + e^{-jwX_{a3}} + e^{-jwX_{a4}} + e^{-jwX_{a5}} + e^{-jwX_{a6}} + \ldots + e^{-jwX_{aN}}]P_1(w)|^2$$

where the locations, $$\overline{X}_a = [X_{a1}, X_{a2}, X_{a3}, X_{a4}, X_{a5}, X_{a6}, \ldots X_{aN}]$$

are the actual print locations including any positioning errors that have occurred, and $P_1(w)$ is as follows:

$$P_1(w) = \frac{4\pi}{D} \sum_{k=-\infty}^{\infty} G\left(\frac{2\pi k}{D}\right) \text{sinc}\left[\frac{wL}{\pi} - \frac{2kL}{D}\right].$$

6. The method for marking according to claim 2, wherein the frequency metric is $$f\left(\overline{X}_p + \overline{e}, \frac{1}{D}\right)$$

and the minimal value is used to determine the adjusted marking location.

7. The method for marking according to claim 2, wherein the $$\mathrm{Min}PSD = \min_{e_{(i+1)}} f\left(\bar{g}, \frac{1}{D}\right).$$

8. The method for marking according to claim 7, wherein $$\bar{g}=\lfloor X_{a1} \ldots X_{ai}(X_{p(i+1)}+e_{(i+1)})(X_{p(i+2)}+e_{(i+1)}) \ldots (X_{pN}+e_{(i+1)})\rfloor.$$

9. The method for marking according to claim 8, wherein the subsequent marking location $X_{d(i+1)}=X_{p(i+1)}+e_{(i+1)}$.

10. The method for marking according to claim 1, wherein the determining and adjusting are performed in real-time between the first and subsequent passes.

11. The method for marking according to claim 1, wherein the system is an N-pass system and passes 2-N are adjusted based on the error for at least one preceding pass.

12. The method for marking according to claim 11, wherein each of passes 2-N is adjusted based on the error determined for an immediately preceding pass.

13. The method for marking according to claim 1, wherein the marking subsystem is an ink jet printer.

14. A multipass marking system for marking a desired image using an interlaced, multipass marking procedure, comprising:
    a marking subsystem having at least one marking device;
    an I/O device that receives input data;
    an interlace routine that determines a priori marking locations for the marking subsystem based on the input data;
    a movement device that moves the marking subsystem to designated marking locations for each of a plurality of passes;
    a position determining device that determines location error in the first pass;
    an interlace adjustment routine that adjusts the marking location for at least one subsequent pass based on the determined location error for the first pass and a defect perceivability metric that is predictive of output marking quality and substantially minimizes a viewer's perception of defect.

15. The multipass marking system according to claim 14, wherein the metric includes a frequency metric.

16. The multipass marking system according to claim 15, wherein the frequency metric includes the power spectral density of the input data evaluated at a fundamental frequency (1/D) of the marking subsystem, where D is the spacing between marking devices.

17. The multipass marking system according to claim 16, wherein the marking location for the at least one subsequent pass corresponds to the minimum value of the frequency metric.

18. The multipass marking system according to claim 14, wherein the system is an N-pass system and passes 2-N are adjusted based on the error for at least one preceding pass.

19. The multipass marking system according to claim 18, wherein each of passes 2-N is adjusted based on the error determined for an immediately preceding pass.

20. The multipass marking system according to claim 14, wherein the marking subsystem is an ink jet printer.

* * * * *